United States Patent
Chang et al.

(10) Patent No.: US 12,468,161 B2
(45) Date of Patent: Nov. 11, 2025

(54) HEAD MOUNTED DEVICE AND HEAD STRAP MODULE

(71) Applicant: HTC Corporation, Taoyuan (TW)

(72) Inventors: Li-Hsun Chang, Taoyuan (TW); Kuan-Ying Ou, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 18/925,027

(22) Filed: Oct. 24, 2024

(65) Prior Publication Data
US 2025/0180916 A1 Jun. 5, 2025

Related U.S. Application Data

(60) Provisional application No. 63/606,565, filed on Dec. 5, 2023.

(51) Int. Cl.
*G02B 27/01* (2006.01)

(52) U.S. Cl.
CPC .............................. *G02B 27/0176* (2013.01)

(58) Field of Classification Search
None
See application file for complete search history.

(56) References Cited

U.S. PATENT DOCUMENTS

| | | | | |
|---|---|---|---|---|
| 4,607,398 A * | 8/1986 | Faulconer | ............... | B63C 11/12 2/452 |
| 5,321,416 A * | 6/1994 | Bassett | ............... | A42B 3/145 348/121 |
| 5,357,654 A * | 10/1994 | Hsing-Chi | ............ | A63B 33/002 2/418 |
| 5,767,820 A * | 6/1998 | Bassett | ............... | G06F 3/011 348/E5.145 |
| 5,950,245 A * | 9/1999 | Binduga | ............... | A42B 3/145 24/68 B |
| 6,708,376 B1 * | 3/2004 | Landry | ............... | A42B 3/145 2/418 |
| 7,000,262 B2 * | 2/2006 | Bielefeld | ............... | A42B 3/145 2/418 |
| 7,043,772 B2 * | 5/2006 | Bielefeld | ............... | A42B 3/145 2/418 |

(Continued)

*Primary Examiner* — Fred Tzeng
(74) *Attorney, Agent, or Firm* — JCIPRNET

(57) ABSTRACT

A head mounted device includes a host and a head strap module. The head strap module includes a bracket and following components. A pair of straps are respectively connected to the host, at least partially overlapped, and movably disposed in the bracket. A pair of elastic members respectively drive the pair of straps to move relative to the bracket to increase an overlapping degree of the pair of straps. A rotating member is rotatably disposed on the bracket on a rotation axis and coupled to the pair of straps to move synchronously relative to the bracket. A braking member is movably disposed on the bracket along the rotation axis and has a second ratchet portion to engage with a first ratchet portion of the rotating member. A reset member is disposed between the bracket and the braking member and maintains the engagement between the second ratchet portion and the first ratchet portion. A driving member is movably disposed on the bracket to release the engagement between the first ratchet portion and the second ratchet portion by force.

10 Claims, 10 Drawing Sheets

(56) References Cited

U.S. PATENT DOCUMENTS

| | | | |
|---|---|---|---|
| 7,174,575 B1 * | 2/2007 | Scherer | A42B 3/145 2/418 |
| 7,707,695 B2 * | 5/2010 | Dubois | A42B 3/145 2/418 |
| 8,161,576 B2 * | 4/2012 | Lemke | A42B 3/145 2/418 |
| 8,359,672 B2 * | 1/2013 | Moelker | A42B 3/145 2/418 |
| 8,370,967 B2 * | 2/2013 | Chen | A42B 3/145 2/418 |
| 9,161,588 B2 * | 10/2015 | Chen | A42B 3/324 |
| 9,572,392 B2 * | 2/2017 | Klotz | A42B 1/22 |
| 9,823,477 B1 * | 11/2017 | Shen | H04W 4/80 |
| 10,502,363 B2 * | 12/2019 | Edwards | F16M 13/04 |
| 10,684,646 B2 * | 6/2020 | Wang | G06F 1/163 |
| 11,163,333 B2 | 11/2021 | Lin et al. | |
| 11,714,454 B1 | 8/2023 | Wu et al. | |
| 2010/0050325 A1 * | 3/2010 | Wang-Lee | A42B 3/145 2/418 |
| 2024/0057272 A1 | 2/2024 | Araki et al. | |
| 2025/0018539 A1 * | 1/2025 | Zhao | B25B 5/14 |

* cited by examiner

HEAD MOUNTED DEVICE AND HEAD STRAP MODULE

CROSS-REFERENCE TO RELATED APPLICATION

This application claims the priority benefit of U.S. provisional application Ser. No. 63/606,565, filed on Dec. 5, 2023. The entirety of the above-mentioned patent application is hereby incorporated by reference herein and made a part of this specification.

BACKGROUND

Technical Field

The disclosure relates to a display device and an accessory adapted to the display device, and particularly relates to a head mounted device (HMD) and a head strap module adapted to the head mounted device.

Description of Related Art

With the increasing development of the technology industry, types, functions, and usage methods of display devices are becoming more diverse, and head mounted devices that can be directly worn on users' heads have emerged accordingly. After a user wears the head mounted device, in addition to seeing stereoscopic images, the images also change as the user's head rotates, providing the user with a more immersive experience.

However, different users have different head circumferences, and a head strap module with adjustable length is needed to accommodate different users. Currently, the length of the head strap module is generally adjusted through a knob to adjust the tightness. The user may spend more time rotating the knob to loosen the head strap module before putting it on and then spend time again rotating the knob to shorten the length of the head strap module and adjust the tightness. Meanwhile, taking off the head mounted device also takes more time to rotate the knob to loosen the head strap module.

SUMMARY

The disclosure provides a head mounted device to offer a simple and intuitive method for wearing.

The disclosure provides a head strap module adapted to a head mounted device for offering a simple and intuitive method for wearing.

A head mounted device provided in the disclosure includes a host and a head strap module. The head strap module includes a bracket, a first strap, a second strap, a first elastic member, a second elastic member, a rotating member, a braking member, a reset member, and a driving member. The first strap has a first connection end and a first adjustment section. The second strap has a second connection end and a second adjustment section. The first connection end and the second connection end are connected to the host, and the first adjustment section and the second adjustment section are at least partially overlapped and are movably disposed in the bracket. The first elastic member is disposed between the bracket and the first strap. The second elastic member is disposed between the bracket and the second strap. The first elastic member and the second elastic member respectively drive the first strap and the second strap to move relative to the bracket to increase an overlapping degree of the first strap and the second strap. The rotating member is rotatably disposed on the bracket on a rotation axis and has a coupling portion and a first ratchet portion. The coupling portion is coupled to the first adjustment section and the second adjustment section and enables the first adjustment section and the second adjustment section to move synchronously relative to the bracket. The braking member is movably disposed on the bracket along the rotation axis and has a second ratchet portion. An engagement between the second ratchet portion and the first ratchet portion allows the rotating member to rotate relative to the bracket along a first clockwise direction of the rotation axis and restricts the rotating member from rotating relative to the bracket in a second clockwise direction opposite to the first clockwise direction. The reset member is disposed between the bracket and the braking member and maintains the engagement between the second ratchet portion and the first ratchet portion to restrict the rotating member from rotating relative to the bracket along the second clockwise direction. The driving member is movably disposed on the bracket and moves the braking member away from the rotating member by force relative to the bracket to release the engagement between the first ratchet portion and the second ratchet portion and allow the rotating member to rotate relative to the bracket along the second clockwise direction.

A head strap module provided in the disclosure is adapted to a head mounted device. The head mounted device includes a host. The head strap module includes a bracket, a first strap, a second strap, a first elastic member, a second elastic member, a rotating member, a braking member, a reset member, and a driving member. The first strap has a first connection end and a first adjustment section. The second strap has a second connection end and a second adjustment section. The first connection end and the second connection end are connected to the host, and the first adjustment section and the second adjustment section are at least partially overlapped and are movably disposed in the bracket. The first elastic member is disposed between the bracket and the first strap. The second elastic member is disposed between the bracket and the second strap. The first elastic member and the second elastic member respectively drive the first strap and the second strap to move relative to the bracket to increase an overlapping degree of the first strap and the second strap. The rotating member is rotatably disposed on the bracket on a rotation axis and has a coupling portion and a first ratchet portion. The coupling portion is coupled to the first adjustment section and the second adjustment section and enables the first adjustment section and the second adjustment section to move synchronously relative to the bracket. The braking member is movably disposed on the bracket along the rotation axis and has a second ratchet portion. An engagement between the second ratchet portion and the first ratchet portion allows the rotating member to rotate relative to the bracket along a first clockwise direction of the rotation axis and restricts the rotating member from rotating relative to the bracket in a second clockwise direction opposite to the first clockwise direction. The reset member is disposed between the bracket and the braking member and maintains the engagement between the second ratchet portion and the first ratchet portion to restrict the rotating member from rotating relative to the bracket along the second clockwise direction. The driving member is movably disposed on the bracket and moves the braking member away from the rotating member by force relative to the bracket to release the engagement between the first ratchet portion and the second ratchet portion and allow the rotating member to rotate relative to the bracket along the second clockwise direction.

Based on the above, in this disclosure, the head strap module itself has the elastic members that can be directly stretched for wearing, and when released, the elastic members are automatically contracted to adapt to different head sizes. To remove the head strap module, a force can be directly applied to the driving member of the head strap module, thus offering a simple and intuitive method for wearing.

DESCRIPTION OF THE EMBODIMENTS

Figure 1:
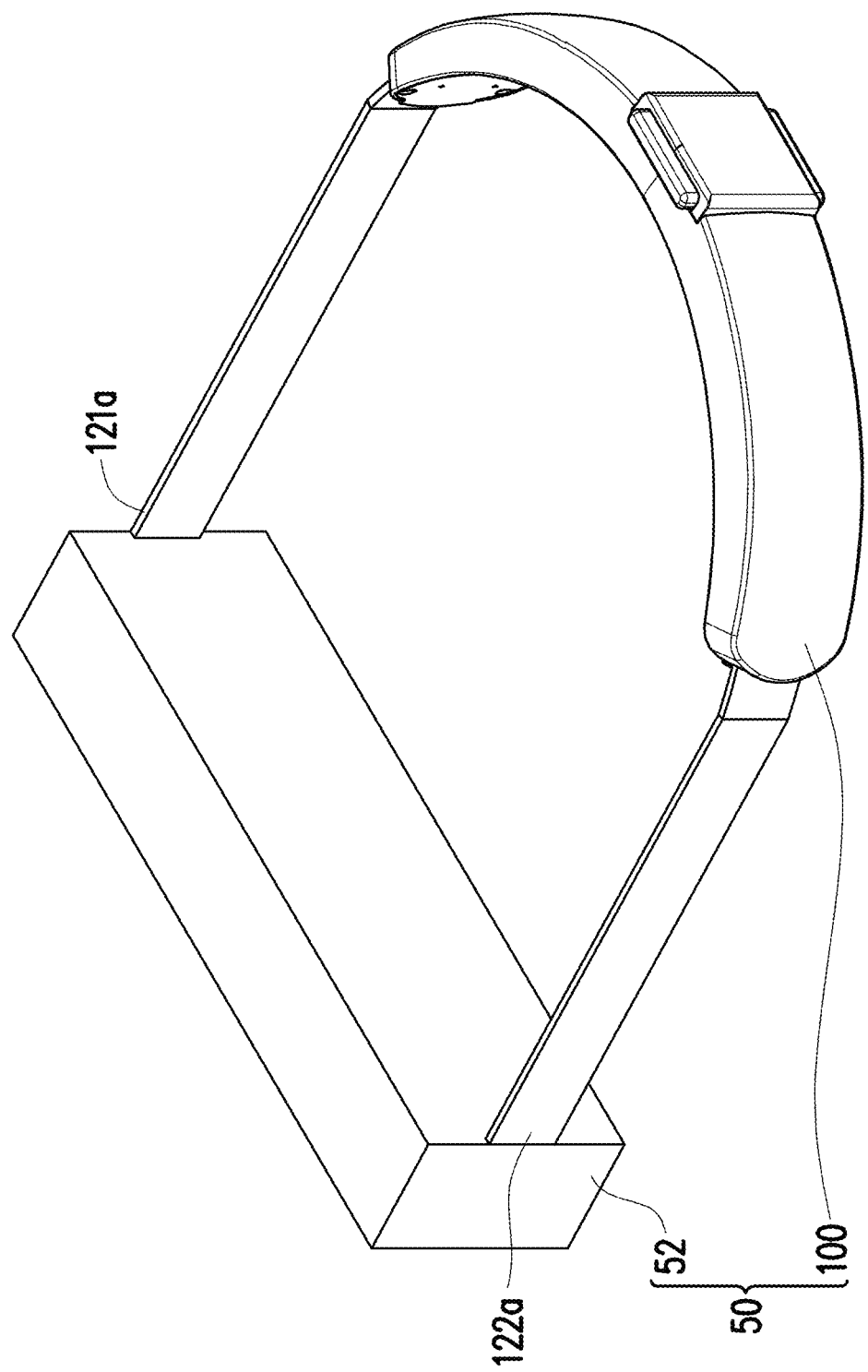
FIG. 1 is a schematic diagram of a head mounted device according to an embodiment provided in the invention.

Please refer to FIG. 1. In this embodiment, a head mounted device 50 includes a host 52. The host 52 is a head mounted display that can be applied in fields such as virtual reality system, augmented reality system, or mixed reality system. The host 52 can include components such as an optical system and a protective casing and can be equipped with a display or be suitable for accommodating a display. The display may be a built-in display or an additional portable display (such as a smartphone or the like), which should not be construed as a limitation herein. The optical system includes optical elements for changing a light path of the display, such as lenses, light-guiding members, prisms, or the like.

Figure 2:
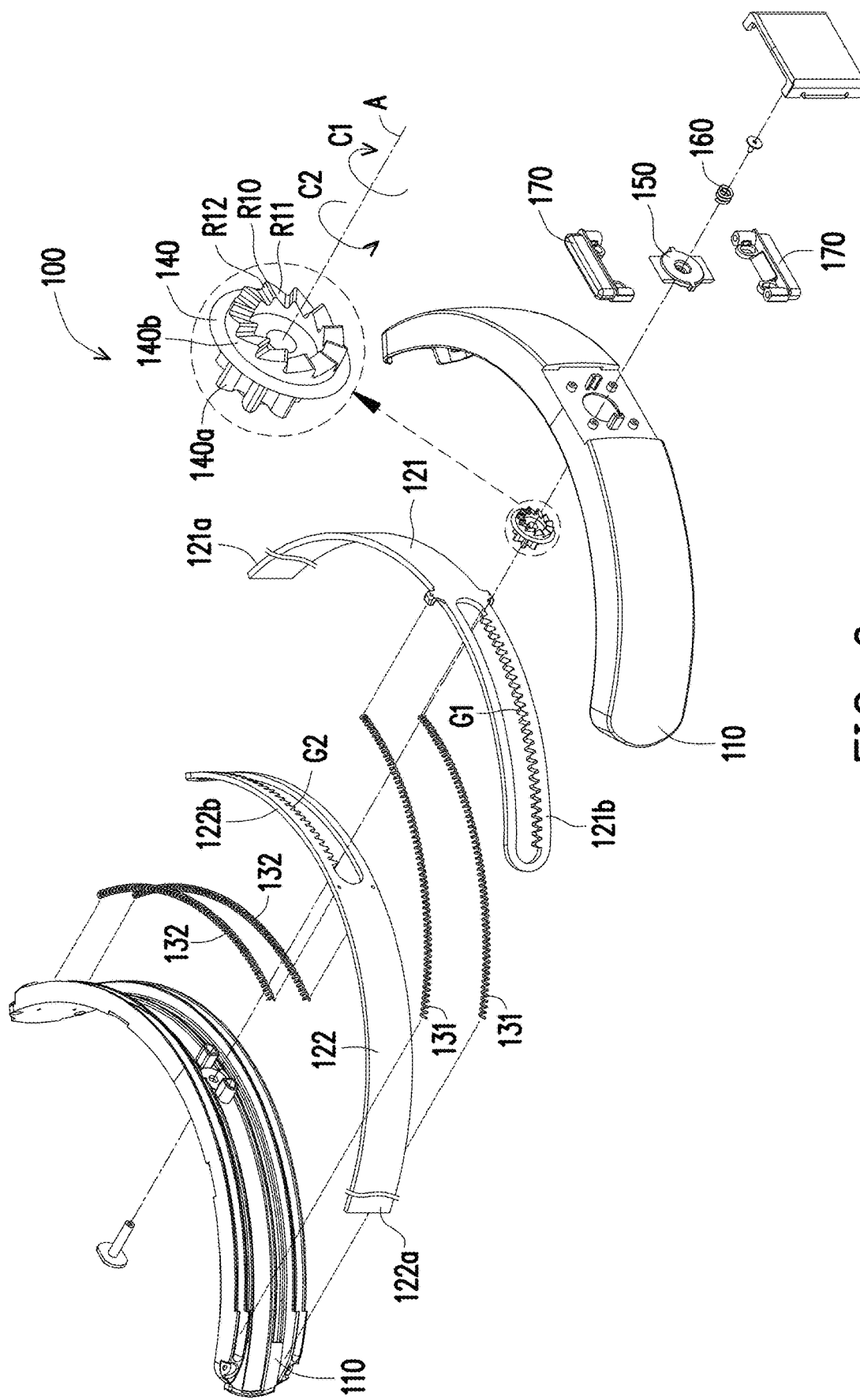
FIG. 2 is an exploded diagram of the head strap module of FIG. 1.
Figure 3:
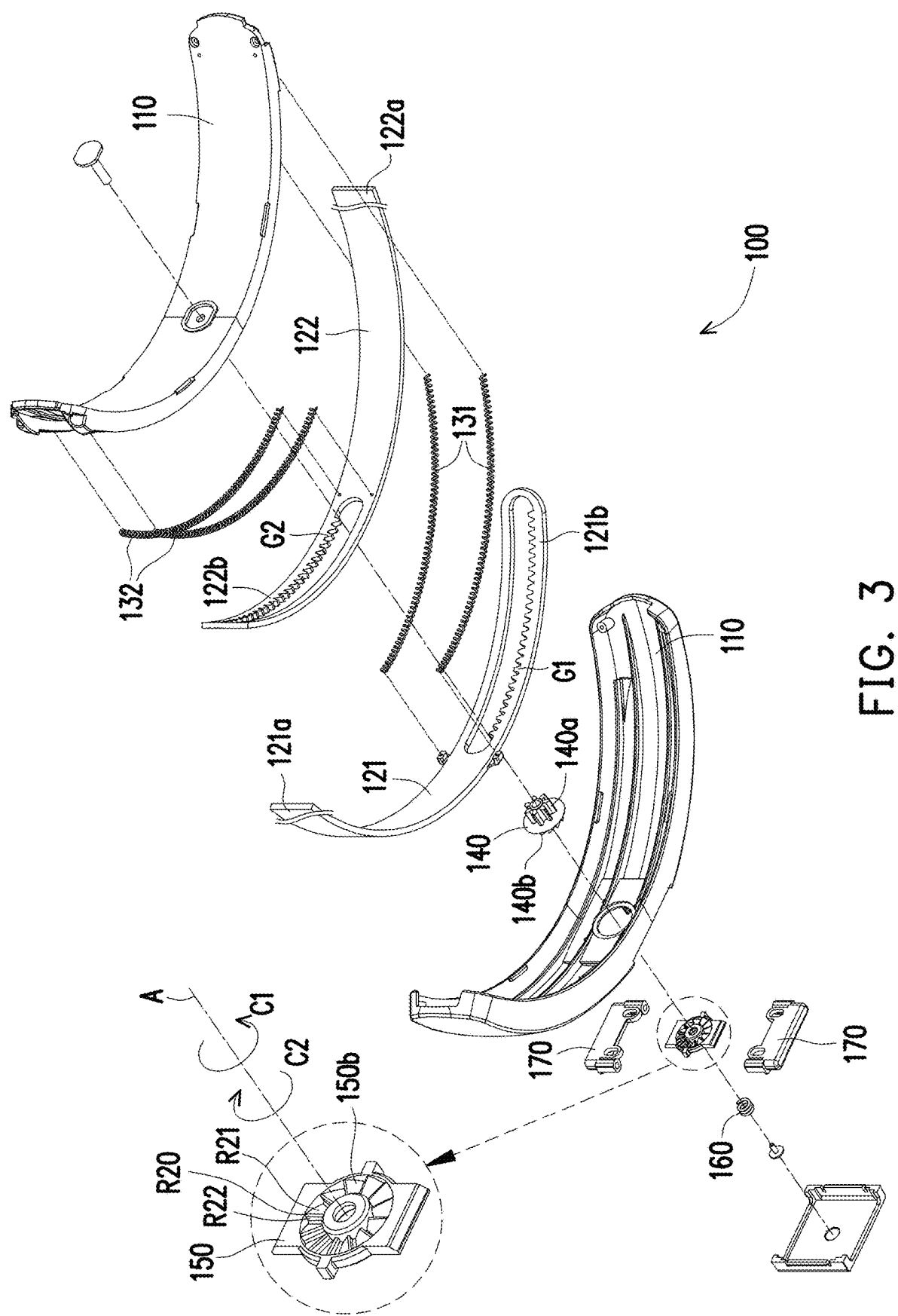
FIG. 3 is an exploded diagram of the head strap module of FIG. 2 at another viewing angle.

Please refer to FIG. 1, FIG. 2, and FIG. 3. In this embodiment, the head mounted device 50 further includes a head strap module 100 configured to temporarily fix the host 52 onto a user's head. The head strap module 100 includes a bracket 110, a first strap 121, a second strap 122, a first elastic member 131, and a second elastic member 132. The bracket 110 is adapted to support the rear side of the user's head. The first strap 121 has a first connection end 121a and a first adjustment section 121b. The second strap 122 has a second connection end 122a and a second adjustment section 122b. The first connection end 121a and the second connection end 122a are connected to the host 52. The first adjustment section 121b and the second adjustment section 122b are at least partially overlapped and movably disposed in the bracket 110. The first elastic member 131 is disposed between the bracket 110 and the first strap 121. The second elastic member 132 is disposed between the bracket 110 and the second strap 122. The first elastic member 131 and the second elastic member 132 respectively drive the first strap 121 and the second strap 122 to move relative to the bracket 110, so as to increase an overlapping degree of the first strap 121 and the second strap 122. The first elastic member 131 and the second elastic member 132 may be springs, elastic cords, elastic rubber members, and so on, which should however not be construed as limitations herein.

Please refer to FIG. 2, FIG. 3, and FIG. 4. In this embodiment, the head strap module 100 further includes a rotating member 140. The rotating member 140 is rotatably disposed on the bracket 110 along a rotation axis A and has a coupling portion 140a. The coupling portion 140a is coupled to the first adjustment section 121b and the second adjustment section 122b, so as to enable the first adjustment section 121b and the second adjustment section 122b to move synchronously relative to the bracket 110. The coupling portion 140a may be a gear, which may engage with a first rack G1 of the first adjustment section 121b and a second rack G2 of the second adjustment section 122b respectively, which should not be construed as a limitation herein.

When the rotating member 140 rotates along a first clockwise direction C1 of the rotation axis A, the first adjustment section 121b and the second adjustment section 122b, which are respectively positioned on two opposite sides of the coupling portion 140a, are moved forward in opposite directions, so as to increase the overlapping degree of the first strap 121 and the second strap 122 and consequently reduce the length of the head strap module 100. By contrast, when the rotating member 140 rotates along a second clockwise direction C2 opposite to the first clockwise direction C1 of the rotation axis A, the first adjustment section 121b and the second adjustment section 122b, which are positioned on the two opposite sides of the coupling portion 140a, return in opposite directions, so as to decrease the overlapping degree of the first strap 121 and the second strap 122 and consequently increase the length of the head strap module 100.

Please refer to FIG. 2, FIG. 3, and FIG. 4. In this embodiment, the head strap module 100 further includes a braking member 150. The braking member 150 is movably disposed on the bracket 110 along the rotation axis A. The rotating member 140 has a first ratchet portion 140b, while the braking member 150 has a second ratchet portion 150b. An engagement between the second ratchet portion 150b and the first ratchet portion 140b controls the rotating member 140 to merely rotate in one single clockwise direction relative to the bracket 110 along the rotation axis A. Specifically, the engagement between the first ratchet portion 140b and the second ratchet portion 150b allows the rotating member 140 to rotate relative to the bracket 110 along the first clockwise direction C1 of the rotation axis A and restricts the rotating member 140 from rotating relative to the bracket 110 along the second clockwise direction C2 of the rotation axis A.

Please refer to FIG. 2, FIG. 3, and FIG. 4. In this embodiment, the first ratchet portion 140b may include a plurality of first ratchet gears R10, which are arranged in a ring-shaped manner around the rotation axis A on the rotating member 140. Two sides of each first ratchet gear R10 are a first inclined surface R11 and a first stopper surface R12, respectively. The first stopper surfaces R12 are nearly vertical surfaces. The second ratchet portion 150b may include a plurality of second ratchet gears R20, which are arranged in a ring-shaped manner around the rotation axis A on the braking member 150. Two sides of each second ratchet gear R20 are a second inclined surface R21 and a second stopper surface R22, respectively. The second stopper surfaces R22 are nearly vertical surfaces.

Figure 4A:
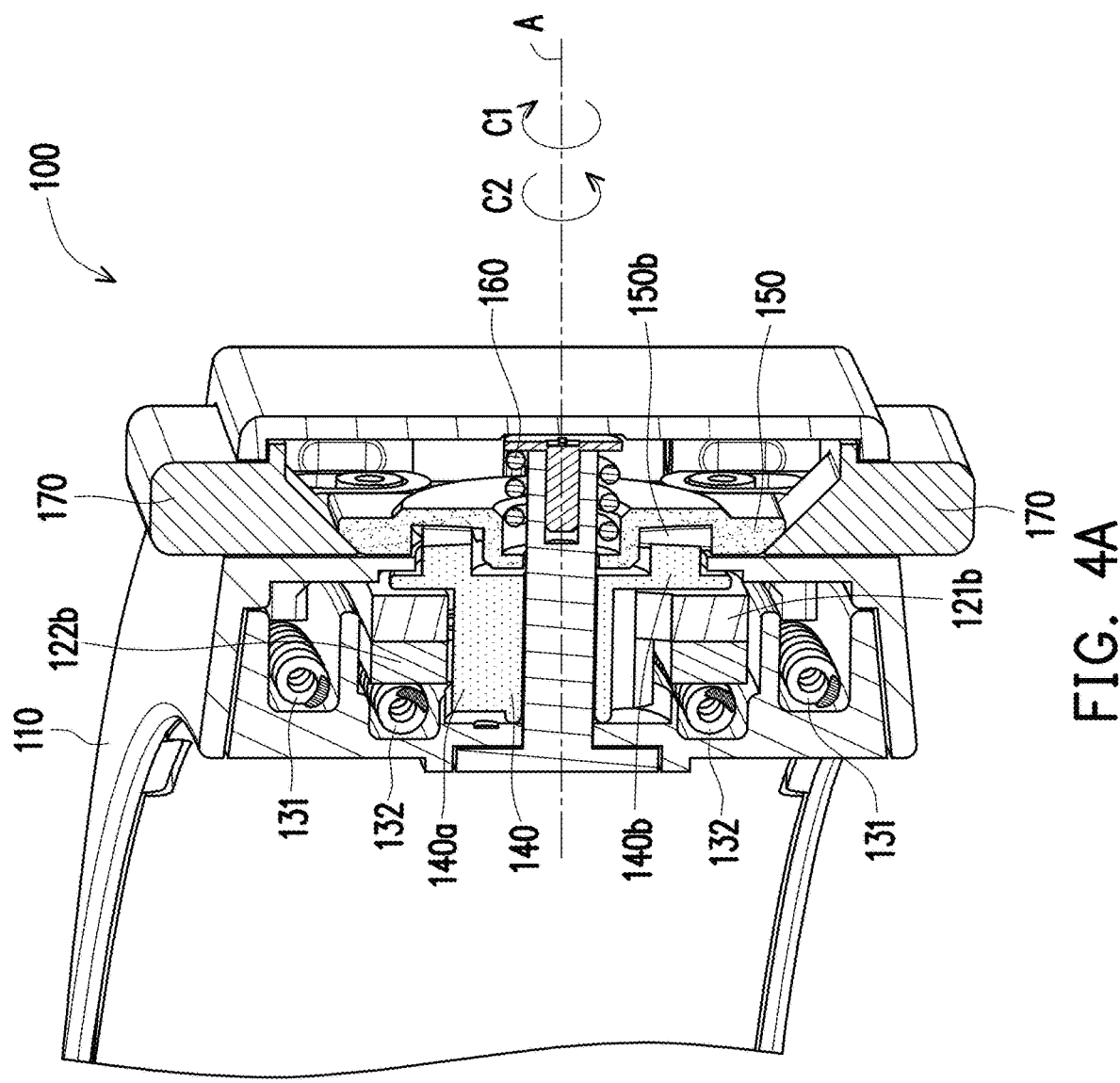
FIG. 4A is a cross-sectional diagram of the head strap module of FIG. 2 in a fixed state along a rotation axis.

Please refer to FIG. 4A. When the first ratchet portion 140b and the second ratchet portion 150b are engaged with each other, the braking member 150 blocks the rotating member 140 through structural interference between the first stopper surfaces R12 and the second stopper surfaces R22, thereby restricting the rotating member 140 from rotating relative to the bracket 110 along the second clockwise direction C2 of the rotation axis A.

Figure 4B:
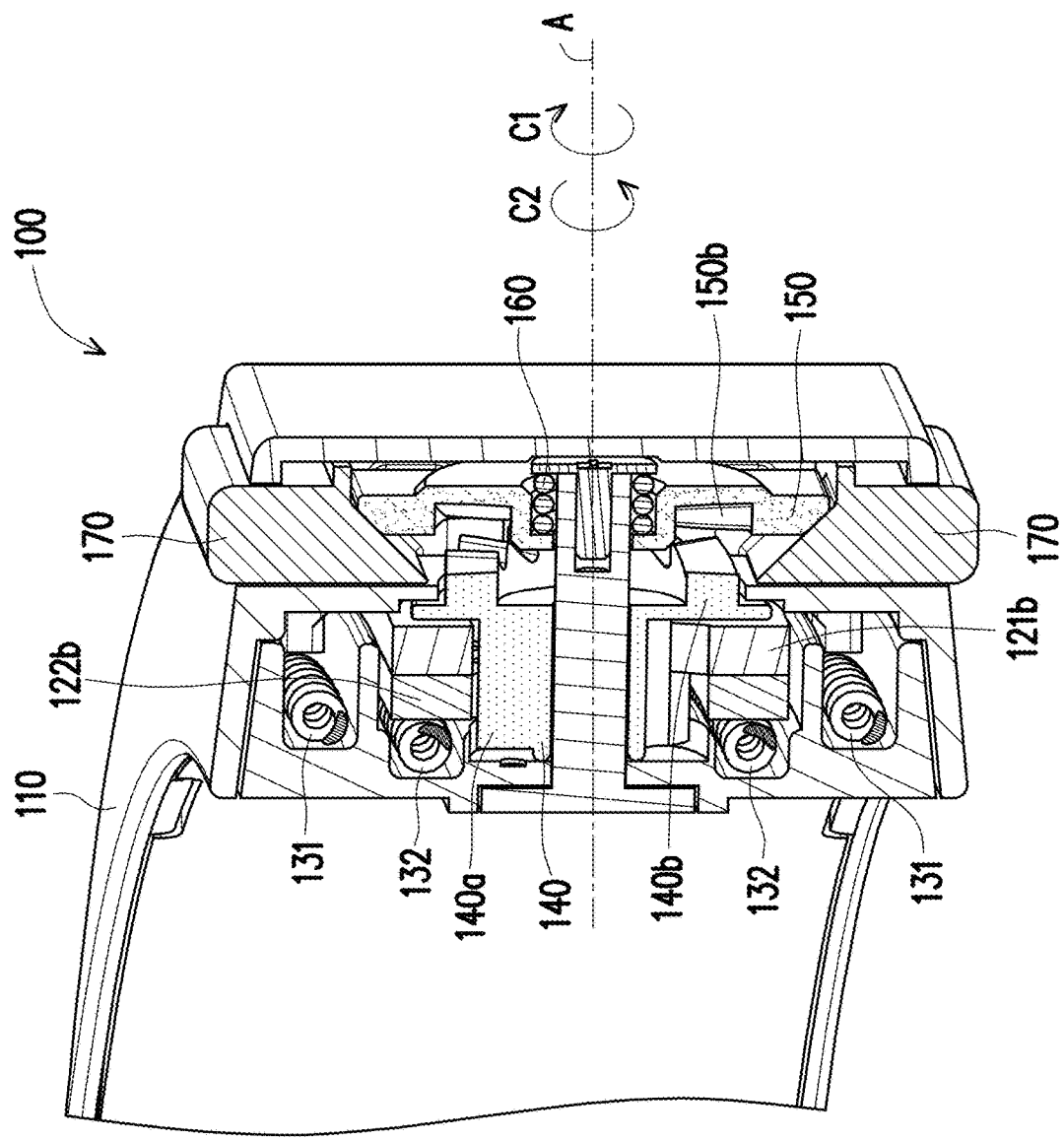
FIG. 4B is a cross-sectional diagram of the head strap module of FIG. 2 in an adjustable state along the rotation axis.

Please refer to FIG. 4A and FIG. 4B. When the first ratchet portion 140b and the second ratchet portion 150b are engaged with each other, the braking member 150 is moved away from the rotating member 140 through an inclined surface movement between the first inclined surfaces R11 and the second inclined surfaces R21, thereby allowing the rotating member 140 to rotate relative to the bracket 110 along the first clockwise direction C1 of the rotation axis A. In other words, when the first ratchet portion 140b and the second ratchet portion 150b are engaged with each other, if the wearing tightness of the head mounted device 50 is intended to be further increased, the bracket 110 may be pushed relative to the host 52 to reduce the wearing dimension of the head mounted device 50 to a desired dimension.

Please refer to FIG. 2, FIG. 3, and FIG. 4A. In this embodiment, the head strap module 100 further includes a reset member 160. The reset member 160 is disposed between the bracket 110 and the braking member 150 and maintains the engagement between the second ratchet portion 150b and the first ratchet portion 140b, so as to restrict the rotating member 140 from rotating relative to the bracket 110 along the second clockwise direction C2. The reset member 160 may be a spring, for instance, which should however not be construed as a limitation herein. In another embodiment not shown, the reset member 160 may further include at least one pair of permanent magnets that can generate magnetic attraction or a magnetic repulsion force.

Please refer to FIG. 2, FIG. 3, FIG. 4A, and FIG. 4B. In this embodiment, the head strap module 100 further includes a driving member 170. The driving member 170 is movably disposed on the bracket 110 and moves the braking member 150 away from the rotating member 140 by force relative to the bracket 110 to release the engagement between the first ratchet portion 140b and the second ratchet portion 150b, thereby allowing the rotating member 140 to rotate relative to the bracket 110 along the second clockwise direction C2.

Please refer to FIG. 1, FIG. 2, FIG. 3, and FIG. 4A. In this embodiment, the driving member 170 are two press portions. The press portions are respectively and movably disposed on the bracket 110 in two directions perpendicular to the rotation axis A and opposite to each other and respectively located on two opposite sides of the braking member 150, so as to move the braking member 150 away from the rotating member 140 through the inclined surface movement by force relative to the bracket 110. The driving member 170 is movably disposed on the bracket 110 in a direction perpendicular to the rotation axis A and at least extended to the two opposite sides of the braking member 150, so as to move the braking member 150 away from the rotating member 140 on the rotation axis A by force relative to the bracket 110.

Please refer to FIG. 1, FIG. 4A, and FIG. 4B. In this embodiment, when the user intends to wear the head mounted device 50, the user may grip the host 52 with one hand and grip the bracket 110 with the other hand and press the driving members 170 to release the engagement between the braking member 150 and the rotating member 140 and allows the first strap 121 and the second strap 122 to move freely relative to the bracket 110, thereby pulling the bracket 110 apart relative to the host 52 to put the head mounted device 50 on the user's head. After the user releases his or her hands, owing to the action of the first elastic member 131 and the second elastic member 132, the wearing dimension of the head mounted device 50 is automatically reduced to fit the size of the user's head. At the same time, owing to the action of the reset member 160, the engagement between the braking member 150 and the rotating member 140 is automatically restored to restrict the wearing dimension of the head mounted device 50 from being enlarged. If further increase in the wearing tightness of the head mounted device 50 is needed, the bracket 110 can be pushed relative to the host 52 to reduce the wearing dimension of the head mounted device 50 to the desired dimension. In other words, when the first ratchet portion 140b and the second ratchet portion 150b are engaged with each other, the user may directly push the bracket 110 to further reduce the wearing dimension of the head mounted device 50 to the desired dimension.

Please refer to FIG. 5, FIG. 6, FIG. 7, and FIG. 8A. In another embodiment, the head mounted device 50 includes the host 52 and the head strap module 100. The head strap module 100 includes the bracket 110, the first strap 121, the second strap 122, the first elastic member 131, the second elastic member 132, the rotating member 140, the braking member 150, the reset member 160, and the driving member 170. The aforementioned components are respectively the same as or similar to the corresponding components in the embodiment depicted in FIG. 1, FIG. 2, and FIG. 3. Compared to the embodiment depicted in FIG. 1, FIG. 2, and FIG. 3, the driving member 170 provided in this embodiment is extended to cover a rear side, a top side, and a bottom side of the bracket 110 to ensure a streamlined appearance.

Figure 8A:
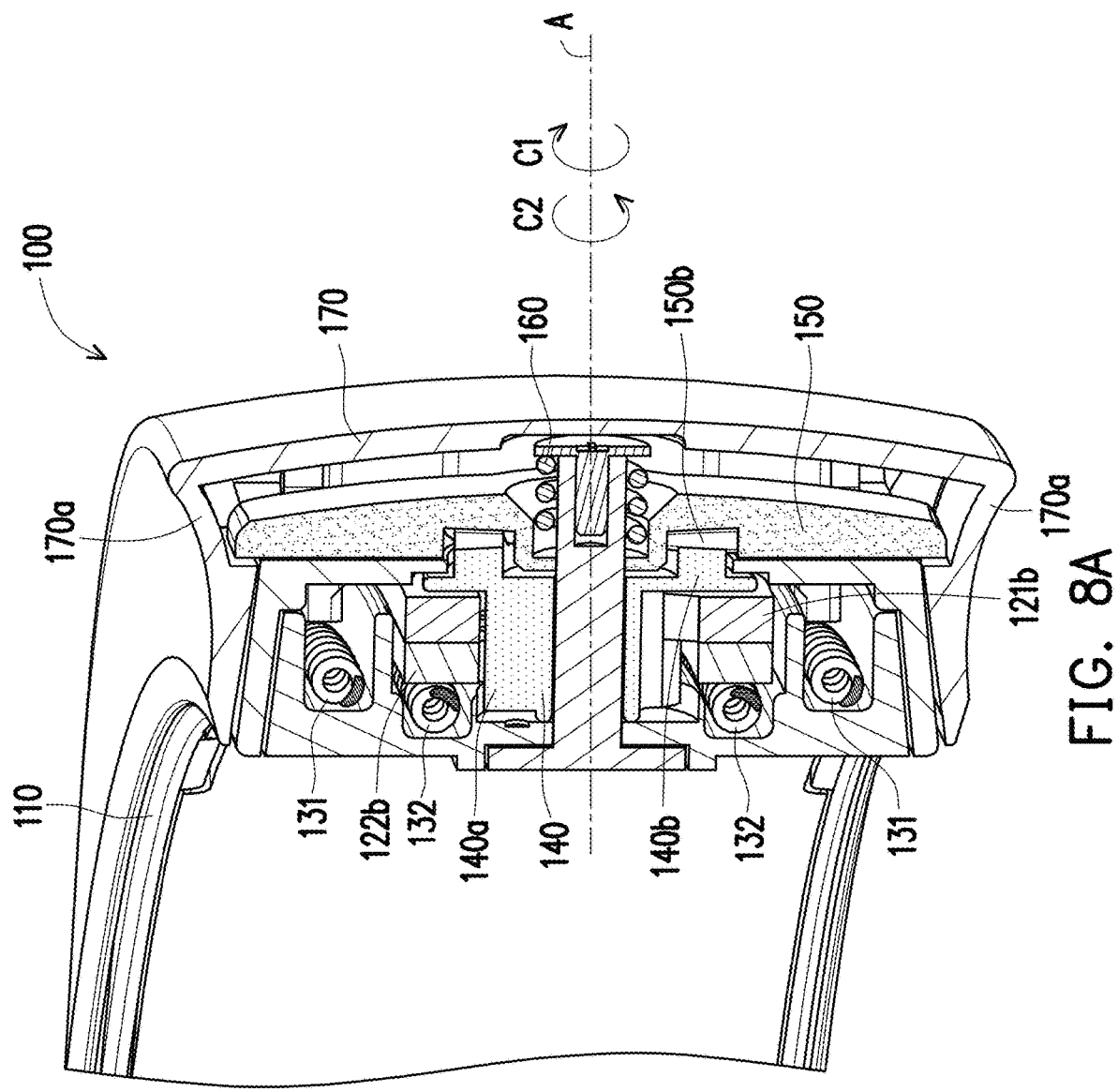
FIG. 8A is a cross-sectional diagram of the head strap module of FIG. 6 in a fixed state along the rotation axis.
Figure 8B:
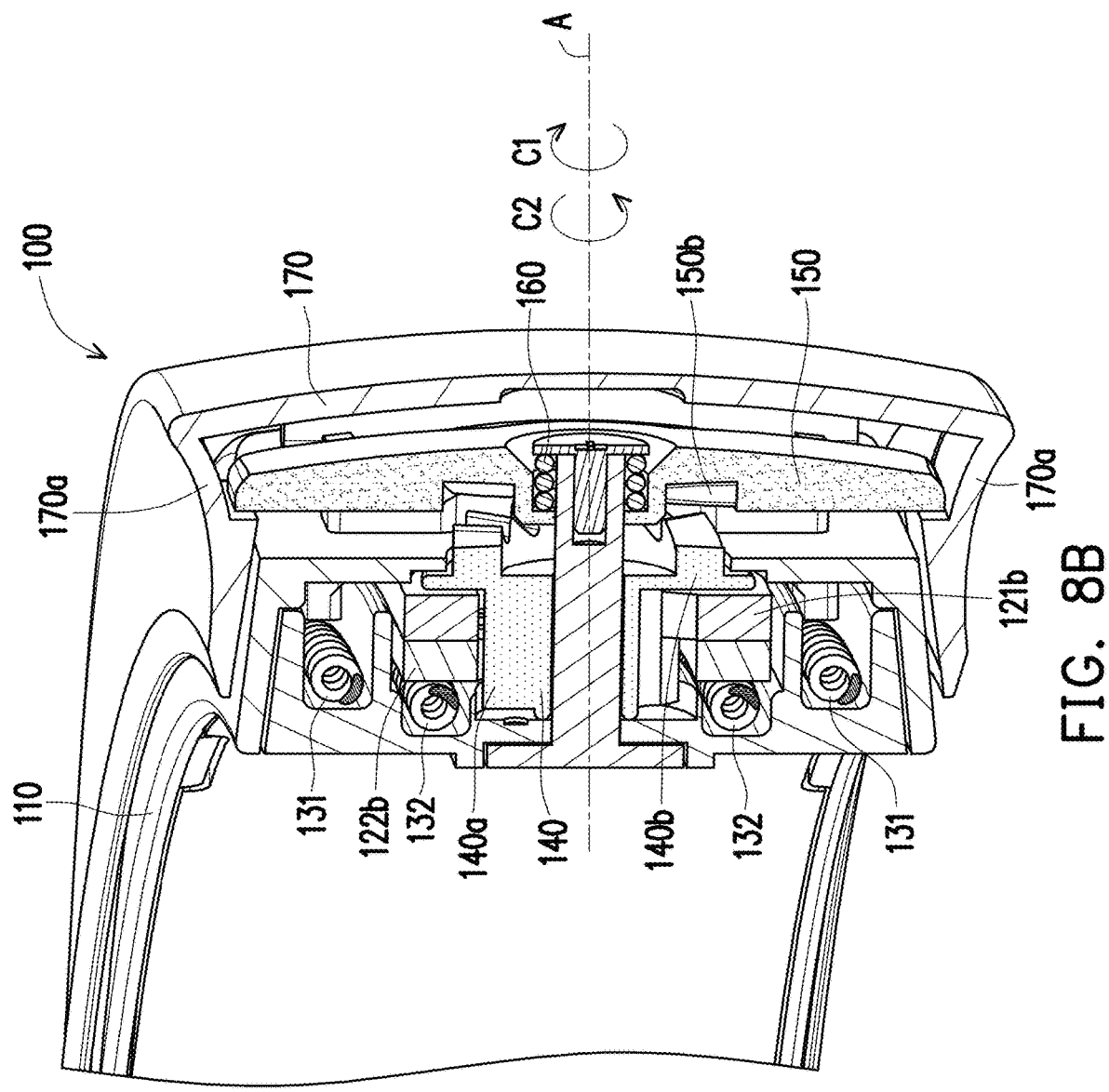
FIG. 8B is a cross-sectional diagram of the head strap module of FIG. 6 in an adjustable state along the rotation axis.

Please refer to FIG. 8A and FIG. 8B. In this embodiment, the driving member 170 may be movably disposed on the bracket 110 and may move the braking member 150 away from the rotating member 140 by force relative to the bracket 110 to release the engagement between the first ratchet portion 140b and the second ratchet portion 150b, thus allowing the rotating member 140 to rotate relative to the bracket 110 along the second clockwise direction C2. To facilitate the application of force by the user's hand, the driving member 170 provided in this embodiment may have two gripping portions, which are respectively located on the top side and the bottom side of the bracket 110, allowing the user to grip the driving member 170 with one hand.

Figure 5:
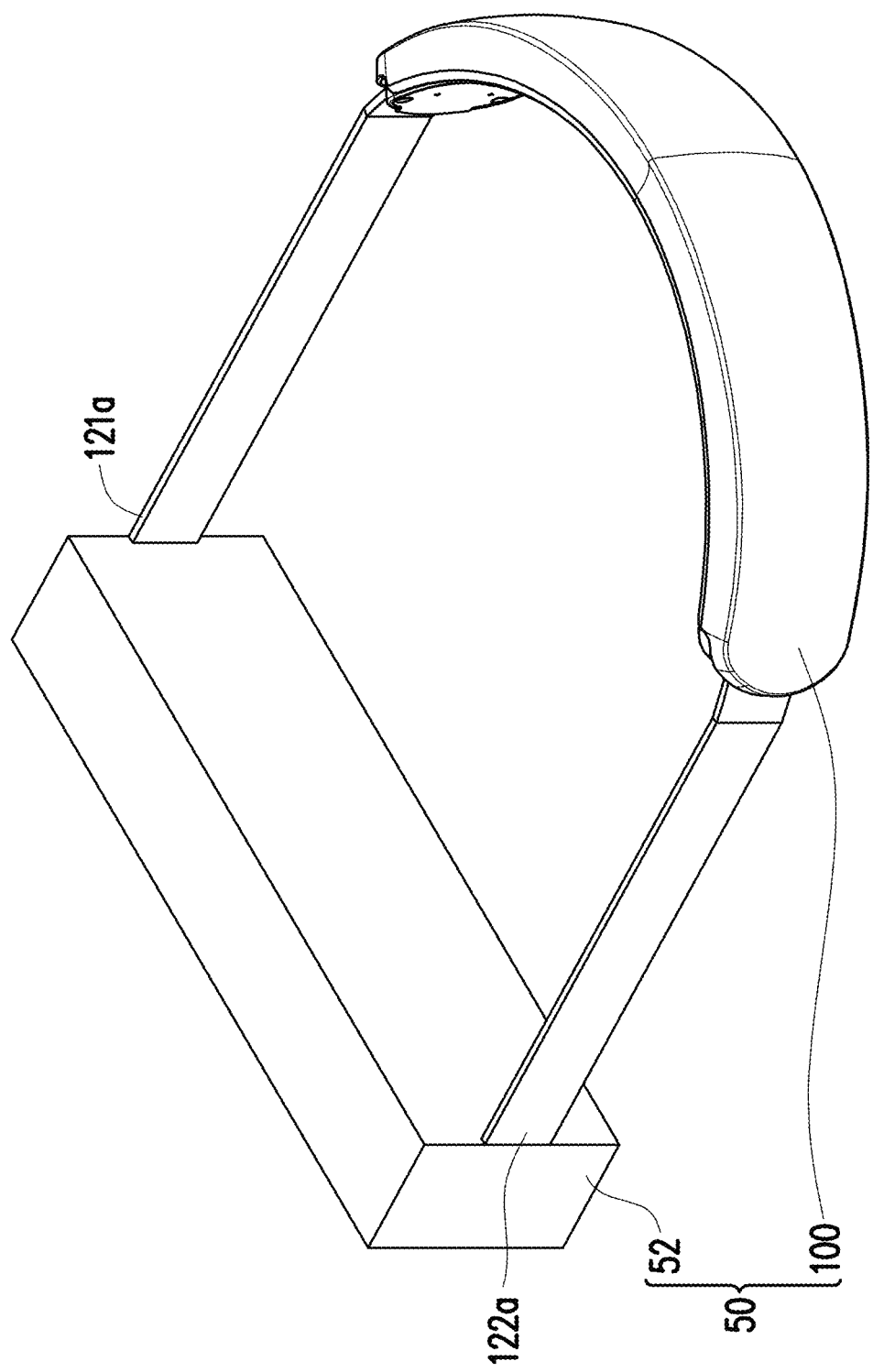
FIG. 5 is a schematic diagram of a head mounted device according to another embodiment of the invention.
Figure 6:
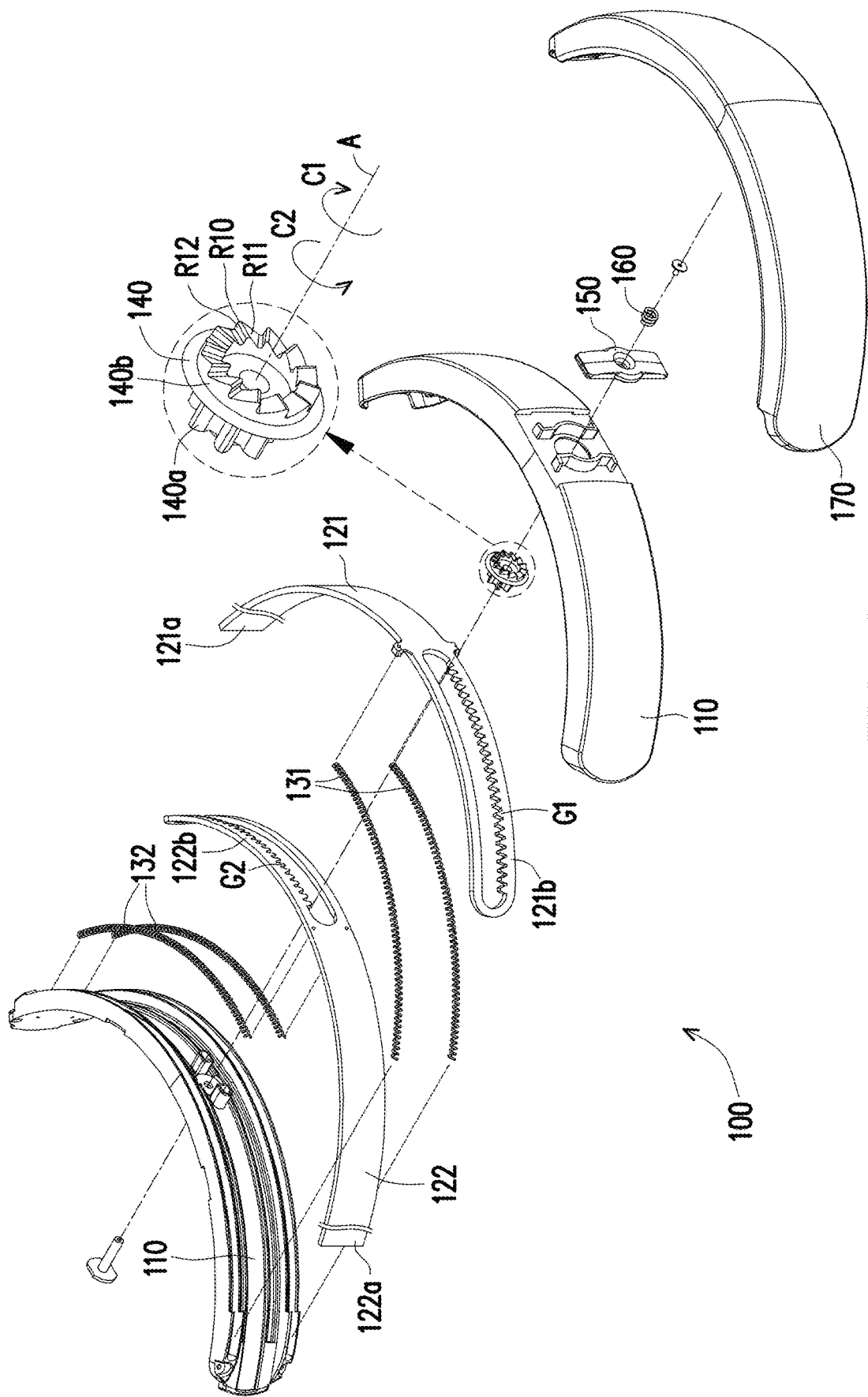
FIG. 6 is an exploded diagram of the head strap module of FIG. 5.
Figure 7:
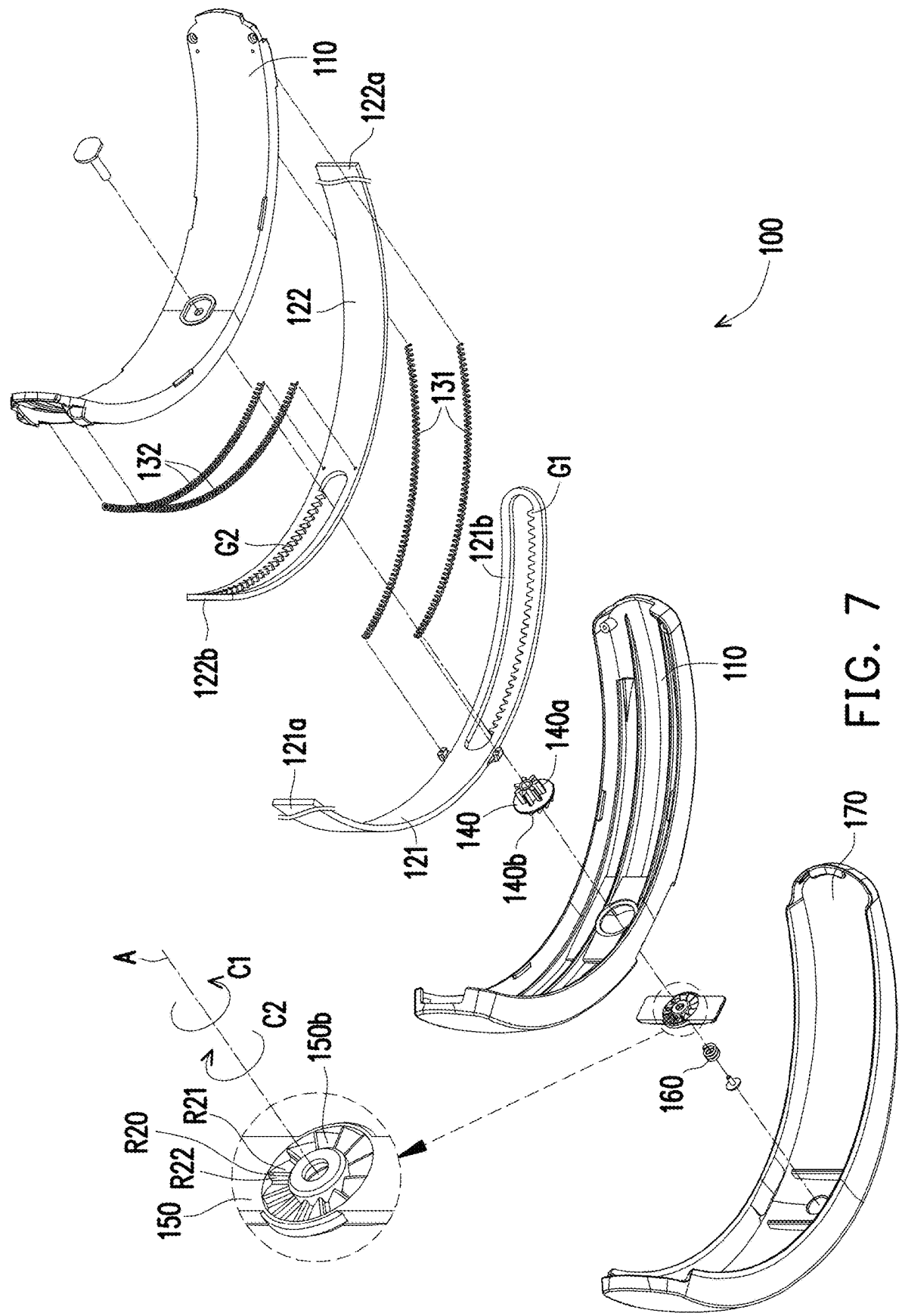
FIG. 7 is an exploded diagram of the head strap module of FIG. 6 at another viewing angle.

Please refer to FIG. 5, FIG. 8A, and FIG. 8B. In this embodiment, when the user intends to wear the head mounted device 50, the user may grip the host 52 with one hand and pull the driving member 170 backward relative to the bracket 110 with the other hand to release the engagement between the braking member 150 and the rotating member 140 and allow the first strap 121 and the second strap 122 to move freely relative to the bracket 110, thereby pulling the bracket 110 away relative to the host 52 to put the head mounted device 50 on the user's head. After the user releases his or her hands, owing to the action of the first elastic member 131 and the second elastic member 132, the wearing dimension of the head mounted device 50 is automatically reduced to fit the size of the user's head. Meanwhile, owing to the action of the reset member 160, the engagement between the braking member 150 and the rotating member 140 is automatically restored to restrict the wearing dimension of the head mounted device 50 from being enlarged. To further increase the wearing tightness of the head mounted device 50, the bracket 110 may be pushed relative to the host 52 to reduce the wearing dimension of the head mounted device 50 to the desired dimension.

To sum up, in this disclosure, the head strap module itself has the elastic members that can be directly stretched for wearing, and when released, the elastic members are automatically contracted to adapt to different head sizes. To remove the head strap module, a force can also be directly applied to the driving member of the head strap module, thus offering a simple and intuitive method for wearing. Moreover, compared to the conventional method of adjusting the length of the head strap module through a knob, this disclosure enables length adjustment of the head strap by directly applying a force to the driving member, resulting in a more streamlined product appearance.

What is claimed is:

1. A head mounted device, comprising:
   a host; and
   a head strap module, comprising:
   a bracket;
   a first strap, having a first connection end and a first adjustment section;
   a second strap, having a second connection end and a second adjustment section, wherein the first connection end and the second connection end are connected to the host, and the first adjustment section and the second adjustment section are at least partially overlapped and movably disposed in the bracket;
   a first elastic member, disposed between the bracket and the first strap;
   a second elastic member, disposed between the bracket and the second strap, wherein the first elastic member and the second elastic member respectively drive the first strap and the second strap to move relative to the bracket to increase an overlapping degree of the first strap and the second strap;
   a rotating member, rotatably disposed on the bracket on a rotation axis and having a coupling portion and a first ratchet portion, wherein the coupling portion is coupled to the first adjustment section and the second adjustment section to enable the first adjustment section and the second adjustment section to move synchronously relative to the bracket;
   a braking member, movably disposed on the bracket along the rotation axis and having a second ratchet portion, wherein an engagement between the second ratchet portion and the first ratchet portion allows the rotating member to rotate relative to the bracket along a first clockwise direction of the rotation axis and restricts the rotating member from rotating relative to the bracket in a second clockwise direction opposite to the first clockwise direction;
   a reset member, disposed between the bracket and the braking member and maintaining the engagement between the second ratchet portion and the first ratchet portion to restrict the rotating member from rotating relative to the bracket along the second clockwise direction; and
   a driving member, movably disposed on the bracket and moving the braking member away from the rotating member by force relative to the bracket to release the engagement between the first ratchet portion and the second ratchet portion and allow the rotating member to rotate relative to the bracket along the second clockwise direction.

2. The head mounted device according to claim 1, wherein the driving member is two press portions, and the press portions are respectively and movably disposed on the bracket in two directions perpendicular to the rotation axis and opposite to each other and are respectively located on opposite sides of the braking member, so as to move the braking member away from the rotating member by force relative to the bracket through an inclined surface movement.

3. The head mounted device according to claim 1, wherein the driving member is movably disposed on the bracket in a direction parallel to the rotation axis and extended at least to two opposite sides of the braking member to move the braking member away from the rotating member on the rotation axis by force relative to the bracket.

4. The head mounted device according to claim 1, wherein the driving member is extended to cover a rear side, a top side, and a bottom side of the bracket.

5. The head mounted device according to claim 1, wherein the driving member has two gripping portions respectively located on a top side and a bottom side of the bracket to allow a user to grip the driving member with one hand.

6. A head strap module, adapted to a head mounted device, the head mounted device comprising a host, the head strap module comprising:
   a bracket;
   a first strap, having a first connection end and a first adjustment section;
   a second strap, having a second connection end and a second adjustment section, wherein the first connection end and the second connection end are connected to the host, and the first adjustment section and the second adjustment section are at least partially overlapped and movably disposed in the bracket;
   a first elastic member, disposed between the bracket and the first strap;
   a second elastic member, disposed between the bracket and the second strap, wherein the first elastic member and the second elastic member respectively drive the first strap and the second strap to move relative to the bracket to increase an overlapping degree of the first strap and the second strap;
   a rotating member, rotatably disposed on the bracket on a rotation axis and having a coupling portion and a first ratchet portion, wherein the coupling portion is coupled to the first adjustment section and the second adjustment section and enables the first adjustment section and the second adjustment section to move synchronously relative to the bracket;
   a braking member, movably disposed on the bracket along the rotation axis and having a second ratchet portion, wherein an engagement between the second ratchet portion and the first ratchet portion allows the rotating member to rotate relative to the bracket along a first clockwise direction of the rotation axis and restricts the rotating member from rotating relative to the bracket in a second clockwise direction opposite to the first clockwise direction;
   a reset member, disposed between the bracket and the braking member and maintaining the engagement between the second ratchet portion and the first ratchet portion, so as to restrict the rotating member from rotating relative to the bracket along the second clockwise direction; and a driving member, movably disposed on the bracket and moving the braking member away from the rotating member by force relative to the bracket to release the engagement between the first ratchet portion and the second ratchet portion and allow the rotating member to rotate relative to the bracket along the second clockwise direction.

7. The head strap module according to claim 6, wherein the driving member is two press portions, and the press portions are respectively and movably disposed on the bracket in two directions perpendicular to the rotation axis and opposite to each other and respectively located on opposite sides of the braking member, so as to move the braking member away from the rotating member by force relative to the bracket through an inclined surface movement.

8. The head strap module according to claim 6, wherein the driving member is movably disposed on the bracket in a direction parallel to the rotation axis and extended to at least to two opposite sides of the braking member, so as to move the braking member away from the rotating member along the rotation axis by force relative to the bracket.

9. The head strap module according to claim 6, wherein the driving member is extended to cover a rear side, a top side, and a bottom side of the bracket.

10. The head strap module according to claim 6, wherein the driving member has two gripping portions respectively located on a top side and a bottom side of the bracket to allow a user to grip the driving member with one hand.

\* \* \* \* \*